(12) United States Patent
Gagnon et al.

(10) Patent No.: US 6,359,279 B1
(45) Date of Patent: Mar. 19, 2002

(54) DETECTOR FOR NUCLEAR IMAGING

(75) Inventors: Daniel Gagnon, Twinsburg; Christopher G. Matthews, Lyndhurst, both of OH (US)

(73) Assignee: Picker International, Inc., Cleveland, OH (US)

( * ) Notice: Subject to any disclaimer, the term of this patent is extended or adjusted under 35 U.S.C. 154(b) by 0 days.

(21) Appl. No.: 09/206,508

(22) Filed: Dec. 7, 1998

(51) Int. Cl.$^7$ .............................. F01T 1/166; G01T 1/20
(52) U.S. Cl. ................. 250/363.1; 250/360.1; 250/370.09
(58) Field of Search ................. 250/363.1, 363.02, 250/370.09, 362, 358.1, 360.1, 366, 307; 378/147, 149

(56) References Cited

U.S. PATENT DOCUMENTS

| | | | |
|---|---|---|---|
| 4,074,778 A | | 2/1978 | Morrell et al. |
| 4,090,080 A | | 5/1978 | Tosswill |
| 4,262,207 A | * | 4/1981 | Tosswill .................. 250/363.1 |
| 4,429,227 A | * | 1/1984 | DiBianc et al. ............ 250/367 |
| 4,982,096 A | * | 1/1991 | Fujii et al. .................. 250/367 |
| 5,152,592 A | | 10/1992 | Krayer |
| 5,530,249 A | | 6/1996 | Luke |
| 5,645,190 A | | 7/1997 | Goldberg |
| 5,991,357 A | * | 11/1999 | Marcovici et al. ............ 378/19 |
| 5,998,792 A | * | 12/1999 | DiFillippo ............. 250/363.05 |

OTHER PUBLICATIONS

W. Mauderli, et al.; A Computerized Rotating Laminar Radionuclide Camera; Journal Nucl. Med. 20: 341–344, 1979.

H.L. Malm, et al.; A Germanium Laminar Emission Camera; IEEE Transactions on Nuclear Science, vol. NS–29, No. 1, pp. 465–468, Feb. 1982.

G. Entine, et al.; Cadmium Telluride Gamma Camera; IEEE Transactions on Nuclear Science, vol. NS–26, No. 1, pp. 552–558, Feb. 1979.

M. M. Urie, et al.; Rotating laminar emission camera with GE–detector: Experimental results; Med.Phys. 8(6), Nov./Dec. 1981; pp. 865–870.

W. Mauderli, et al.; Rotating laminar emission camera with GE–Detector: An analysis; Med. Phys. 8(6), Nov./Dec. 1981; pp. 871–876.

W. Mauderli, et al.; Rotating laminar emission camera with Ge–detector: Further developments; Med. Phys. 14(6), Nov./Dec. 1987; pp. 1027–1031.

S. Webb,et al., "Monte Carlo modelling of the performance of a rotating slit–collimator for improved planar gamma–camera imaging"; *Phys. Med. Biol.*, 1992, vol. 37, No. 5, pp. 1095–1108.

* cited by examiner

*Primary Examiner*—Constantine Hannaher
*Assistant Examiner*—Albert Gagliardi
(74) *Attorney, Agent, or Firm*—John J. Fry

(57) ABSTRACT

A radiation detector includes slit collimator. A radiation detector receives radiation which has been received in each of the slits. The aspect ratio of the detector is approximately three, and each semiconductor radiation detector has a transverse dimension which is less than that of its respective slit. A reconstruction processor generates an image indicative of the radiation received by the detectors. The detector may be rotated about a fixed axis. Alternately, the detector may be translated in coordination with its rotation to provide a substantially square field of view.

46 Claims, 8 Drawing Sheets

DETECTOR FOR NUCLEAR IMAGING

BACKGROUND

The present invention relates to the art of diagnostic imaging. It finds particular application in conjunction with nuclear or gamma cameras and single photon emission computed tomography (SPECT) and will be described with particular reference thereto. It is to be appreciated, however, that the present invention will also find application in other non-invasive investigation techniques and imaging systems such as single photon planar imaging, whole body nuclear scans, positron emission tomography (PET) and other diagnostic modes.

In diagnostic nuclear imaging, one or more radiation detectors are mounted on a movable gantry to view an examination region which receives a subject therein. Typically, one or more radiopharmaceuticals or radioisotopes such as $^{99m}$Tc or $^{18}$F-Fluorodeoxyglucose (FDG) capable of generating emission radiation are introduced into the subject. The radioisotope preferably travels to an organ of interest whose image is to be produced. The detectors scan the subject along a selected path or scanning trajectory and radiation events are detected on each detector.

In a traditional scintillation detector, the detector includes a scintillation crystal that is viewed by an array of photomultiplier tubes. A collimator which includes a grid- or honeycomb-like array of radiation absorbent material is located between the scintillation crystal and limits the angle of acceptance of radiation which will be received by the scintillation crystal. The relative outputs of the photomultiplier tubes are processed and corrected to generate an output signal indicative of the position and energy of the detected radiation. The radiation data is then reconstructed into an image representation of a region of interest.

A so-called rotating laminar radionuclide camera ("ROLEC") has been disclosed by Tosswill and others. Devices utilizing a cadmium telluride (CdTe) detector arrangement have been disclosed in Mauderli, et al., A Computerized Rotating Laminar Radionuclide Camera, J. Nucl. Med 20: 341–344 (1979) and Entine, et al., Cadmium Telluride Gamma Camera, IEEE Transactions on Nuclear Science, Vol. NS-26, No. 1: 552–558 (1979). According to one version, the device included a linear array of CdTe detectors separated by tungsten plates that confined the field of view of each detector to one dimension. The device had a square (approximately 4 cm×4 cm) active area, although a circular lead mask reduced the active area to 13.2 cm$^2$. The detectors, which had platinum-film electrodes, were attached to copper strips on a printed circuit board that also served as the base of the collimator and as a support for amplifier-discriminator circuits.

A ROLEC having a 250 mm×250 mm active area was disclosed in Tosswill, U.S. Pat. No. 4,090,080, issued May 16, 1978 and entitled Imaging. The device included scintillating plastic sheets disposed between parallel collimator plates supported by a steel frame. Fiber optics epoxied to the rear surface of each scintillating sheet transferred light generated in the each of the detectors to a corresponding photomultiplier. According to Tosswill, the ROLEC may be operated moving its axis along another curved or other configuration or without rotation, with symmetry preferred but not essential.

Devices using a segmented germanium crystal have been described by Urie, et al., Rotating Laminar Emission Camera with GE-detector, Med. Phys. 8(6): 865–870 (1981); Mauderli, et al., Rotating Laminar Emission Camera with GE-Detector: An Analysis, Med. Phys. 8(6): 871–876 (1981); Malm, et al., A Germanium Laminar Emission Camera, IEEE Transactions on Nuclear Science, Vol. NS-29, No. 1: 465–468 (1982); and Mauderli, et al., Rotating Laminar Emission Camera with GE-detector: Further Developments, Med. Phys. 14(6): 1027–1031 (1987).

In a first version, a 11.5 mm thick, 45 mm×45 mm segmented germanium detector was placed behind parallel tungsten plates. The crystal was segmented to form a plurality of channels, with the plates aligned with the segmentations. A 4.5 cm diameter viewing aperture was located between the detector and the activity source. Projection data acquired at multiple angular orientations as the detector-collimator assembly was rotated about its center was mathematically reconstructed to form a two-dimensional image of the activity distribution.

A second version simulated a 195 mm×195 mm detection area. Five germanium blocks having a total length of 250 mm segmented into distinct electrical channels. The detector was translated linearly in a direction perpendicular to the plane of the plates to simulate a full-size detector.

One advantage of ROLECs is their high efficiency relative to traditional Anger cameras. In particular, the structure of the collimator permits a greater percentage of incident radiation to reach the surface of the detector. Spatial resolution may be improved by increasing the height of the collimator or reducing the distance between the collimator elements with less effect on efficiency as compared to traditional cameras.

While ROLECs have the advantage of relatively higher efficiency and spatial resolution, they have been expensive to produce inasmuch as significant quantities of relatively expensive detector material have been required. Although detector material cost can be reduced by using a number of relatively smaller detector segments, such an approach complicates the manufacturing process and requires that variations in the response of the individual segments be considered.

Still another drawback is that the collimator slat length has been equal to the detector field of view. This has required additional detector, collimator, and structural material, has introduced spurious counts which do not contribute to useful image information, and has introduced additional mass and bulk into a rotating structure.

Yet another disadvantage to ROLECs has been their circular field of view.

SUMMARY

Embodiments of the present invention address these matters, and others.

According to a first aspect of the present invention, a radiation detection apparatus includes a detector. The detector includes a plurality of longitudinally-spaced radiation attenuative septa which define a plurality of slits. Each slit has a longitudinal and a transverse dimension, the transverse dimension being greater than the longitudinal dimension. The detector also includes a plurality of detector segments, each detector segment having a transverse dimension and detecting radiation received in a corresponding slit. The apparatus also includes a drive operatively connected to one of the detector and the object so as to vary the angular relationship between the slits and the object. The transverse dimensions of the detector segments are less than the longitudinal field of view of the detector.

According to a more limited aspect of the invention, a detector segment includes two or more sub-segments. The sum of the transverse dimensions of the sub-segments is less than the longitudinal field of view.

According to another more limited aspect of the invention, the detector includes first and second radiation attenuative side shields.

According to another more limited aspect of the invention, the aperture aspect ratio of the detector is greater than one.

According to a still more limited aspect, the transverse dimension of the septa are given by the equation $$W_y = \frac{LFOV \times (C_z + W_z) + H \times C_y}{C_z + W_z + H}.$$

According to another more limited aspect of the invention, the transverse dimension of each detector segment is less than the transverse dimension of the corresponding slit.

According to a still more limited aspect, each detector segment includes at least two detector sub-segments. The sum of the transverse dimensions of the sub-segments is less than the transverse dimension of the slit.

According to another limited aspect of the invention, radiation attenuative members are disposed between detector segments which detect radiation received in adjacent slits. The thickness of the radiation attenuative material portion may be less than the thickness of the septum. The septa may include a material free region adapted to receive the radiation attenuative members.

According to a still more limited aspect, an electrical conductor in electrical contact with a detector segment is disposed between the radiation attenuative member and the detector segment.

According to another limited aspect of the invention, the detector segments are physically discrete.

According to another limited aspect of the invention, a cross section of the detector segments is one of round and rectangular.

According to another limited aspect of the invention, the apparatus includes a reconstruction processor operatively connected to the detector segments for generating an image indicative of radiation received by the detector segments.

According to another limited aspect of the invention, the apparatus includes means for supporting the detector in relation to an object being imaged.

According to another aspect of the present invention, an apparatus includes a detector which includes a collimator having a plurality of longitudinally spaced radiation attenuative elements which define a plurality of longitudinally spaced apertures each having transverse dimension greater than it longitudinal dimension. The collimator is movable during the examination so as to vary the angular relationship between the apertures and the object. The detector also includes a plurality of radiation sensitive detector segments each having a transverse dimension and detecting radiation received in a corresponding aperture. The aperture aspect ratio of the detector is greater than one. The apparatus also includes a reconstruction processor operatively connected to the detector segments for generating an image indicative of radiation received by the detector segments.

According to a more limited aspect of the invention, the detector segments include a semiconductor. The semiconductor material may be cadmium zinc telluride.

According to still another more limited aspect, the detector segments include a scintillating material and a photodetector in optical communication with the scintillating material. According to a still more limited aspect, the scintillating material is cesium iodide.

According to another aspect of the present invention, a rotating laminar emission camera has an aspect ratio greater than one.

According to another aspect of the present invention, an apparatus for detecting radiation indicative of an object includes a detector having a plurality of septa. The detector also includes a plurality of radiation attenuative members. Detector segments which detect radiation received in adjacent slits have a radiation attenuative member interposed therebetween.

According to a more limited aspect, the septa and the radiation attenuative members comprise tungsten.

According to a more limited aspect, the septa and the radiation attenuative members are mounted for transverse movement relative to the septa.

According to another aspect of the present invention, a method includes using a detector to detect gamma radiation indicative of radionuclide decays, rotating the detector in a plane, and in coordination with the rotation of the detector, translating the detector so that the sensitivity of the detector is substantially constant over a non-circular field of view.

The non-circular field of view may be a square. According to a more limited aspect, the detector is translated in coordination with its rotation so that a line segment perpendicular to the longitudinal axis traces the path traveled by the centroid of a curve of constant width rotating within the square. The curve of constant width may be a Reuleaux triangle.

FIGURES

FIGS. 5A, 5B, 5C, and 5D depict alternate embodiments of a detector.

Figure 6:
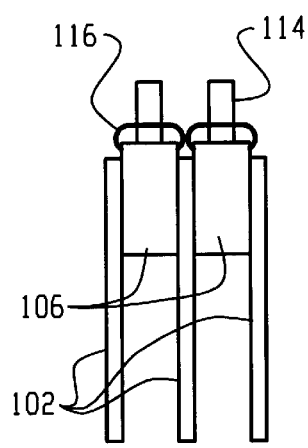

FIG. 6 depicts electrical connections to a detector.

Figure 7:
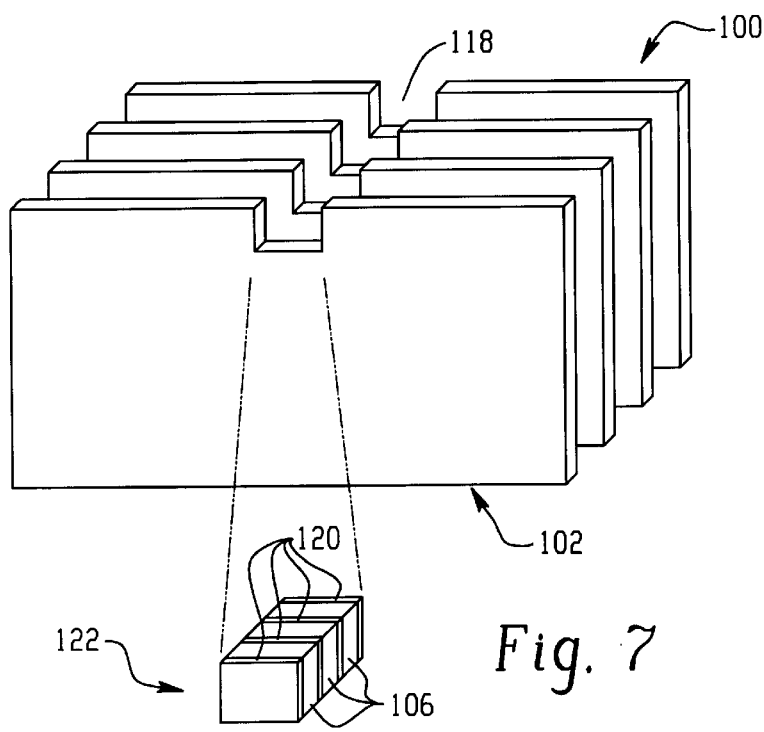

FIG. 7 depicts an arrangement for mounting detector segments.

Figure 8A:
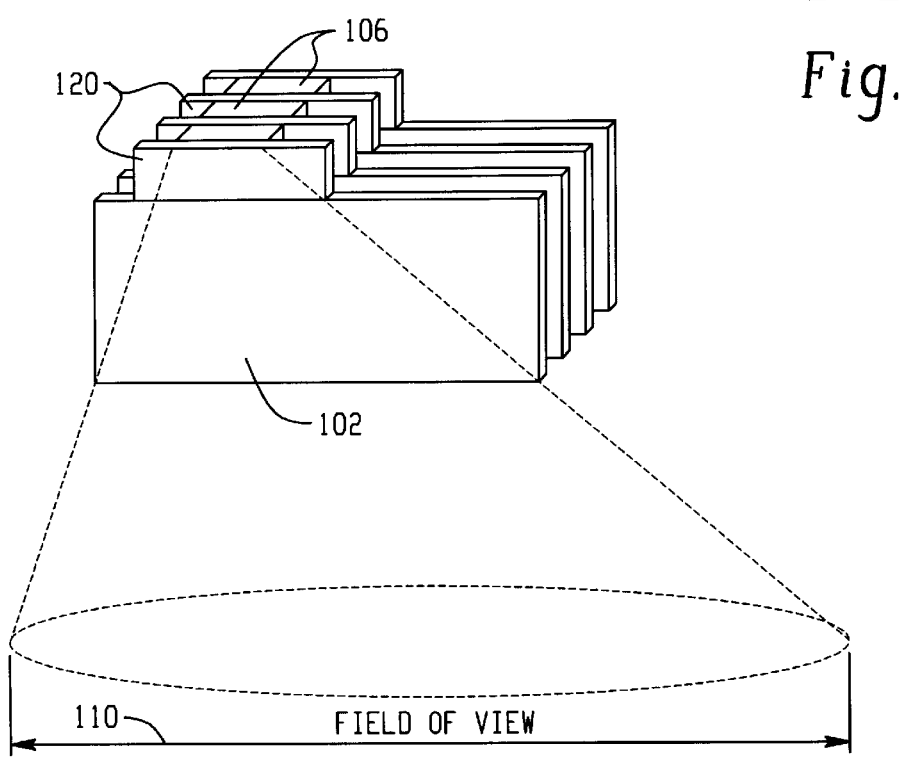

FIG. 8A depicts an arrangement for mounting detector segments.

Figure 8B:
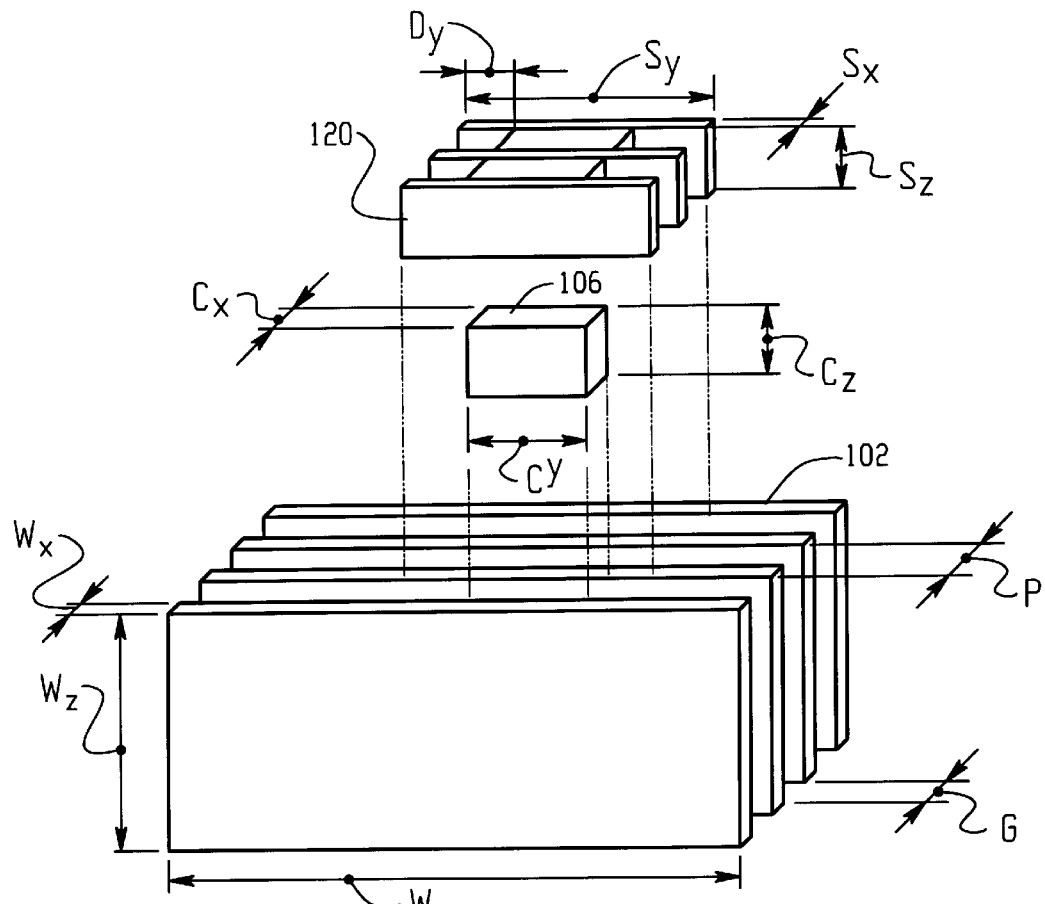

FIG. 8B depicts the arrangement of FIG. 8A in exploded view.

Figure 8C:
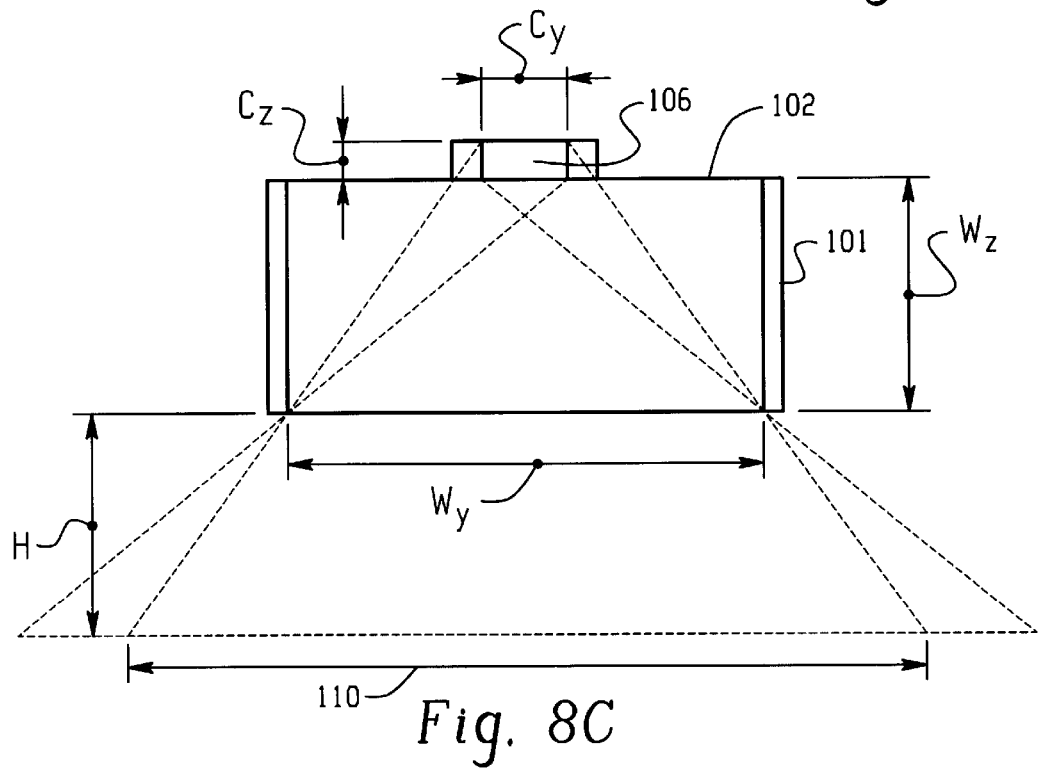

FIG. 8C depicts side view of the arrangement of FIG. 8A.

Figure 9A:
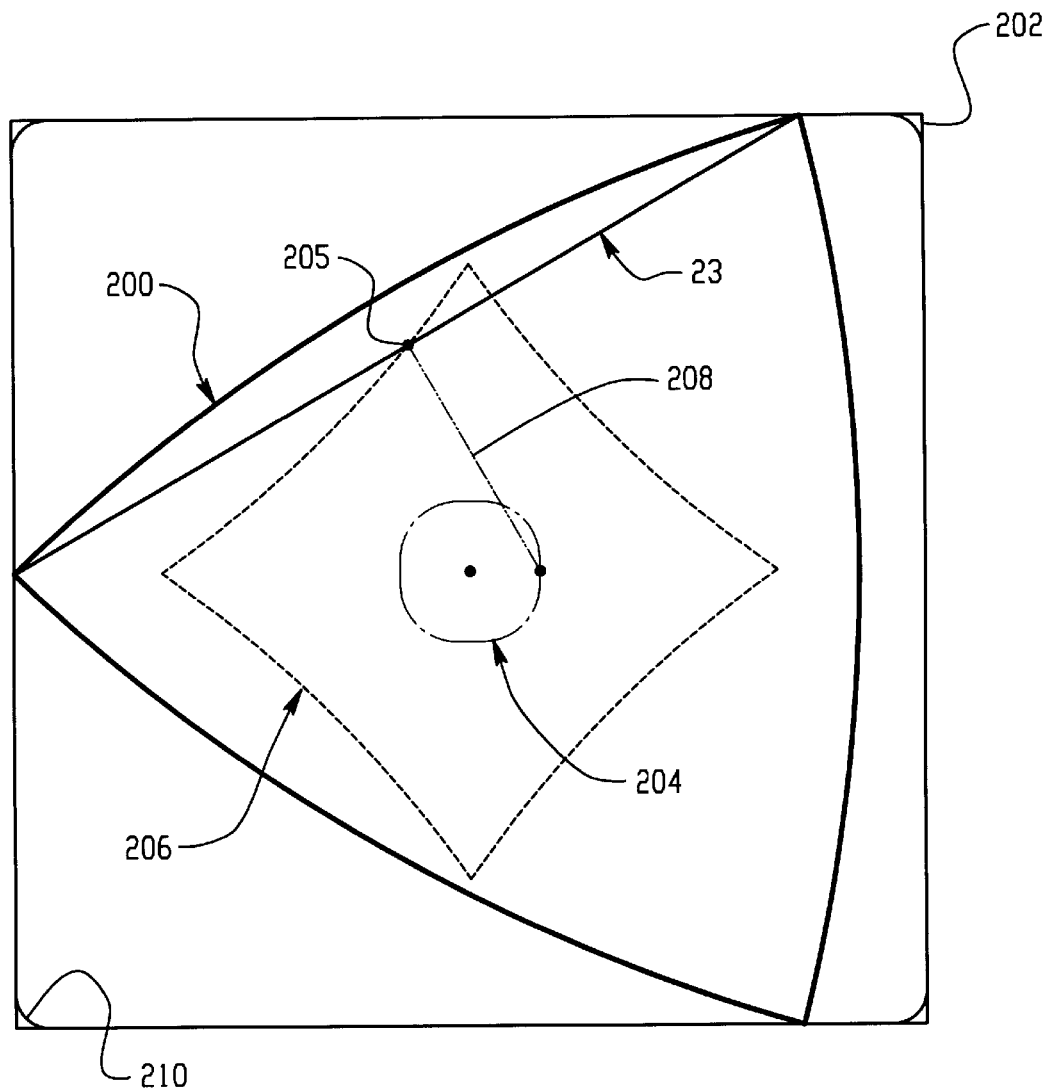
Figure 9B:
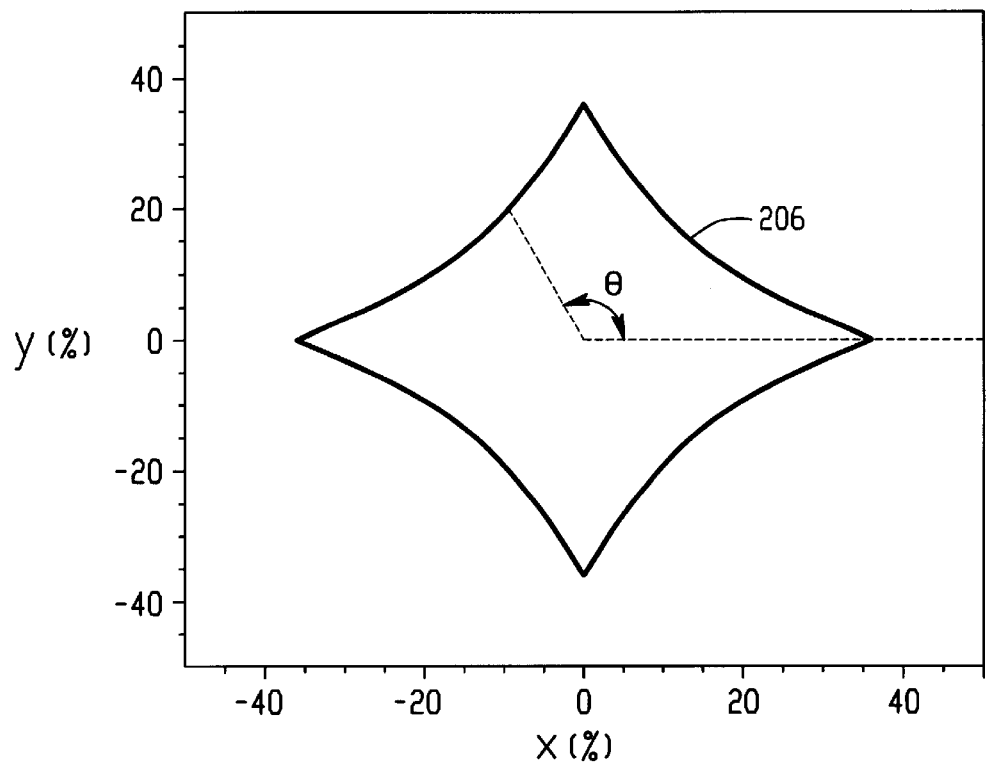
Figure 9C:
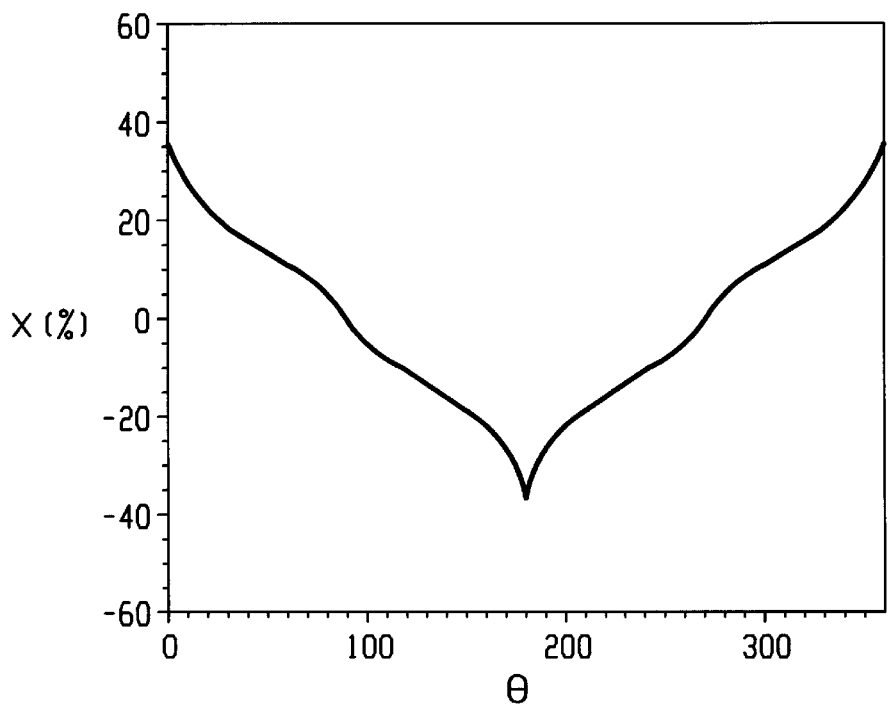

FIGS. 9A, 9B, and 9C depict an orbit for a detector.

Figure 10A:
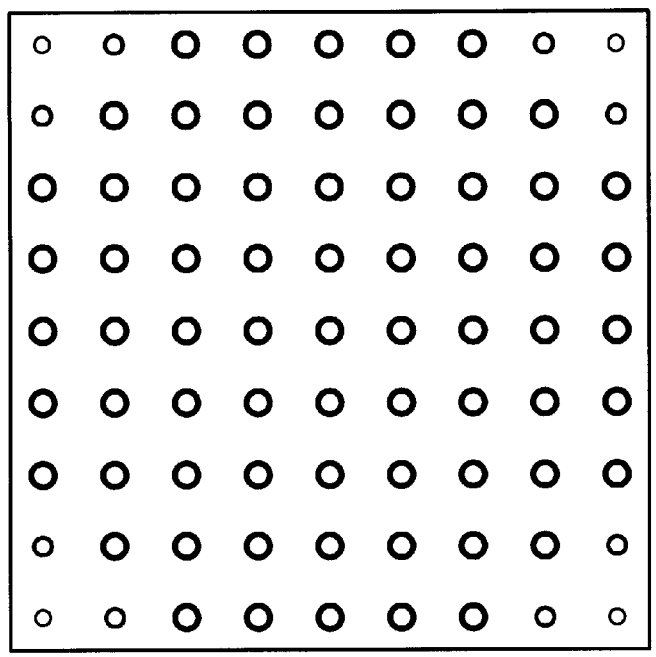
Figure 10B:
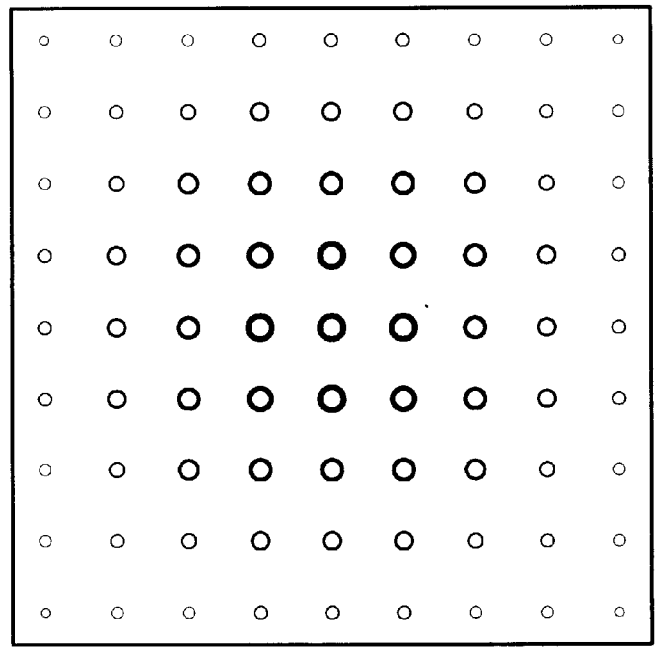

FIGS. 10 and 10B depict a reconstructed field of view of a detector following a Reuleaux orbit and a circular orbit respectively.

DESCRIPTION

Figure 1:
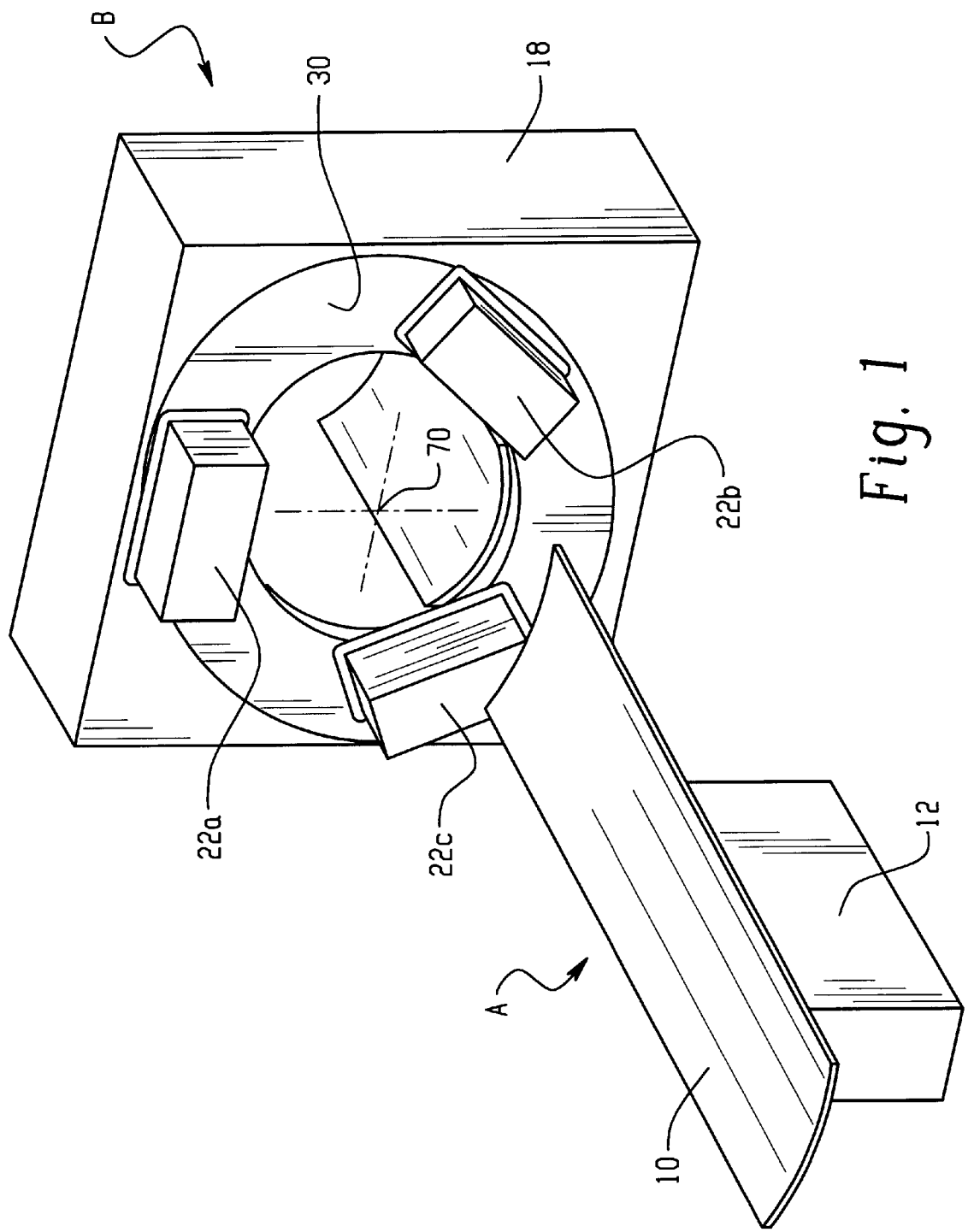
FIG. 1 depicts an exemplary nuclear imaging apparatus.

With reference to FIG. 1, an object being imaged such as a patient is supported on a support A. The support includes a thin, relatively radiation transmissive support surface 10 which is mounted cantilevered from a base 12. The base includes motors for raising and lowering the support surface and for extending and retracting the support surface in a longitudinal direction relative to a nuclear camera gantry B.

Alternately, relative longitudinal motion may be achieved by moving the gantry B in the longitudinal direction.

The gantry B includes stationary 18 and rotating 30 gantry portions. Detectors 22a, 22b, 22c are mounted to the rotating gantry portion 30 and define an aperture into which the anatomy of a patient may be inserted. Each detector 22 includes an enclosure comprised of a radiation attenuative material such as lead. The detectors are mounted to the gantry 30 so as to be rotatable about an axis of rotation 70, radially toward and away from the imaging region, and tangentially with respect to the imaging region. The relative angular positions of the detectors about the examination region may also be varied. As the gantry rotates about the axis of rotation 70, the rotating detectors define a generally circular imaging region, the precise shape of which may vary if the detectors are moved radially during rotation of the gantry 30. As is known in the art, radiation data is collected as the detectors are rotated about the imaging region, with the data used to generate an image indicative of the detected radionuclide decays.

While the detector has been described as having three detectors 22, greater (e.g., four or more) or fewer (e.g., 1 or 2) numbers of detectors may be used. It is not necessary that the detectors be disposed at equal angular intervals about the examination region; a variety of different configurations may be implemented. It is also not necessary that the detectors be moved with respect to or rotated about the patient; relative motion may be provided by moving the patient with respect to the detectors.

Those skilled in the art will recognize that the gantry shown in FIG. 1 is exemplary of a gantry which provides a number of degrees of freedom. Of course, other suitable detector and patient supports may be implemented, provided that the desired relative motion (if any) between the detector (s) and the patient or between the detectors themselves is provided.

Figure 2:
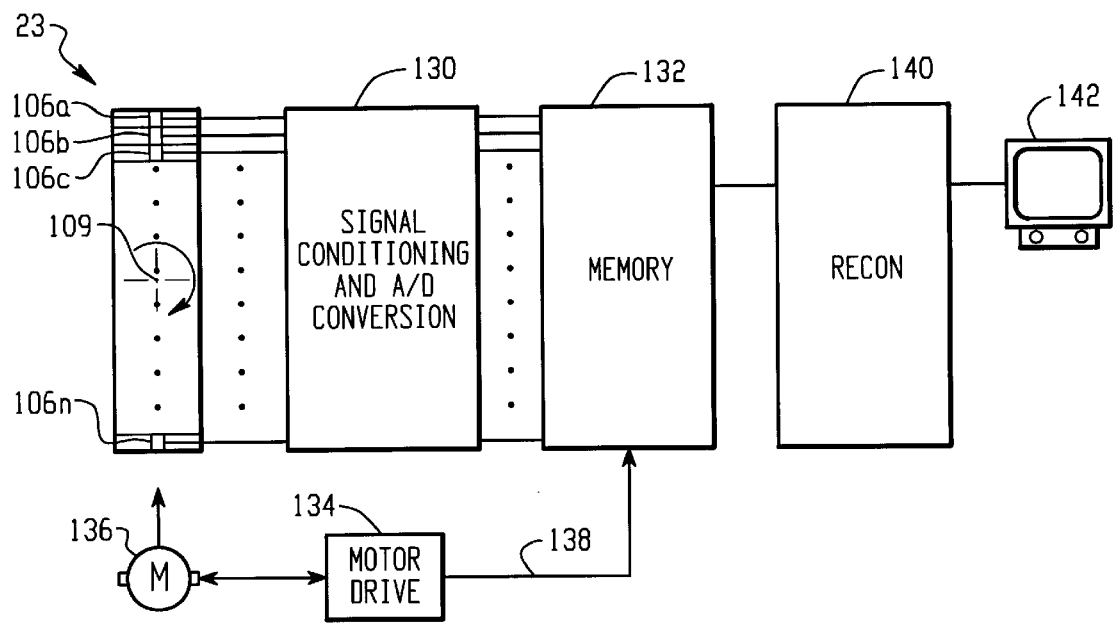
FIG. 2 depicts the functional relationships of data conditioning and processing for an imaging apparatus.

Turning now to FIG. 2, each detector includes a rotating detector portion 23. Signals from the detector elements 106a, 106b, ... 106n of each detector are received by signal conditioning and analog to digital conversion circuitry 130 and stored in memory 132. A motor drive 134 drives a motor 136 which causes the rotating portion 23 to rotate about an axis of rotation 109 perpendicular to a major plane of the rotating portion. A signal 138 indicative of the rotational position of the rotating portion is provided to memory 132 and the data from the detector elements 106 stored accordingly. A reconstruction processor 140 reconstructs the data for display in human readable form on a display device 142 such as a monitor, film, or the like. Where the detectors 22 are rotated about the imaging region about the axis of rotation 70, tomographic images, for example a plurality of axial slices, may be generated. The data may be reconstructed using a two step process. First, the data received by the detector elements 106 at each of a plurality of positions about the axis of rotation 109 is reconstructured to create a two-dimensional data set analogous to the data generated by a conventional two dimensional detector. Two dimensional data sets obtained at a plurality of positions about the axis of rotataion 70 may in turn be reconstructed so as to create volumetric image data. Alternately, the data may be reconstructed using a single step process whereby the data received by the detector elements 106 at each of a plurality of positions about the axis of rotation 109 and the axis of rotation 70 are reconstructed directly to form the volumetric image data.

Figure 3:
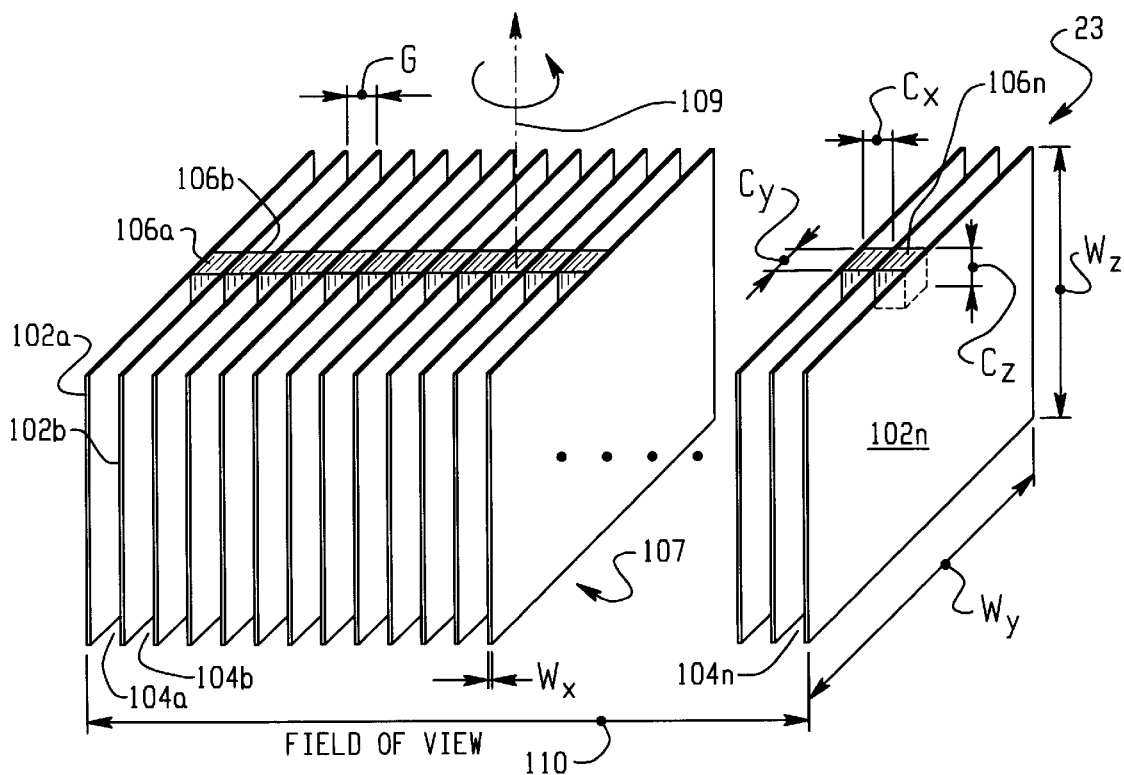
FIG. 3 is a perspective view of a detector for a nuclear imaging apparatus.

With reference to FIG. 3, the rotating detector portion 23 includes a collimator having a plurality of rectangular, parallel spaced apart septa or slats 102a, 102b, ... 102n. The septa are constructed from a radiation attenuative material. In a preferred embodiment, the septa are fabricated from tungsten, although other materials providing suitable attenuation may be used.

The spacing between the septa defines a plurality of slits 104a, 104b, ... 104n having a width G. Each septum has a height Wz, a transverse dimension Wy, and a thickness Wx. A front edge 107 of the septa faces the examination region. The detector longitudinal dimension may be defined as the longitudinal deminsion of the detector at the rear of the septa. Where the septa are parallel, the longitudinal field of view 110 (LFOV) corresponds to the number of septa multiplied by their spacing.

A radiation sensitive detector element 106a, 106b, ... 106n is disposed so as to detect radiation received in each of the slits 104a, 104b, ... 104n. Each of the detectors 106a, 106b, ... 106n has a transverse dimension Cy, a thickness Cx, and a height Cz The detectors are centered about the midpoint of the transverse dimension Wy of the septa 102, although they may be offset therefrom. In one embodiment, the detector elements are fabricated from scintillating materials such as cesium iodide (CsI) or sodium iodide (NaI) in optical communication with a photo diode or other appropriate photodetector. A semiconductor detector material such as cadmium zinc telluride (CdZnTe) may also be used. Depending on the requirements of a particular application, other materials such as silicon (Si), germanium (Ge), cadmium telluride (CdTe) , $HgI_2$, gallium arsenide (GaAs), bismuth sulphate ($Bi_2S_3$), $PbI_2$, GaSe, AlSb, or CdSe may also be used.

The rotating detector portion 23 is rotatable about an axis of rotation 109 perpendicular to is major plane. The detector may be rotated continuously as radiation data is collected. Alternately, data may be collected with the detector located at a plurality of discrete angular positions.

Figure 4:
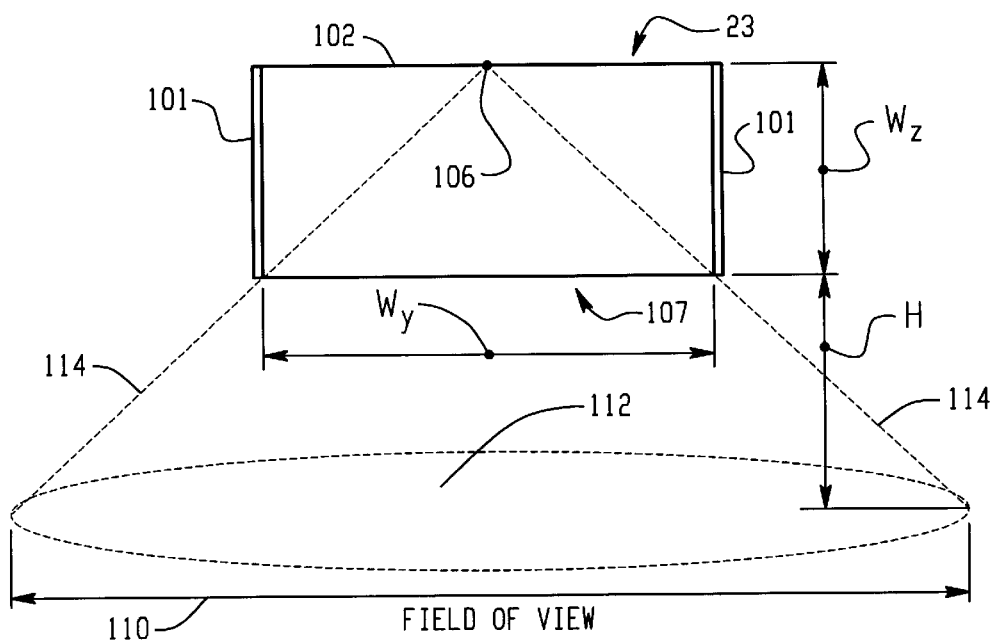
FIG. 4 is a side view of a detector for a nuclear imaging apparatus.

FIG. 4 depicts a side view of a detector wherein, for ease of illustration, the transverse dimension Cy and height Cz of the detector elements 106 are zero. Lead side shields 101 extend along the sides of the detector. The detector is typically operated with the front 107 of the septa at a height H above an imaging plane 112. The corner projections 114 of the septa 102 intersect the imaging plane 112 to define a transverse field view 110 therein. The aperture aspect ratio is preferably selected so that the transverse field of view 110 is equal to the LFOV of the detector 23. In the embodiment of FIG. 4, the aperture aspect ratio is determined according to the following relationship:

$$\text{Aperature Aspect Ratio} = \frac{LFOV}{W_y} = \frac{W_z + H}{W_z} \qquad \text{Eq. 1}$$

Figure 5A:
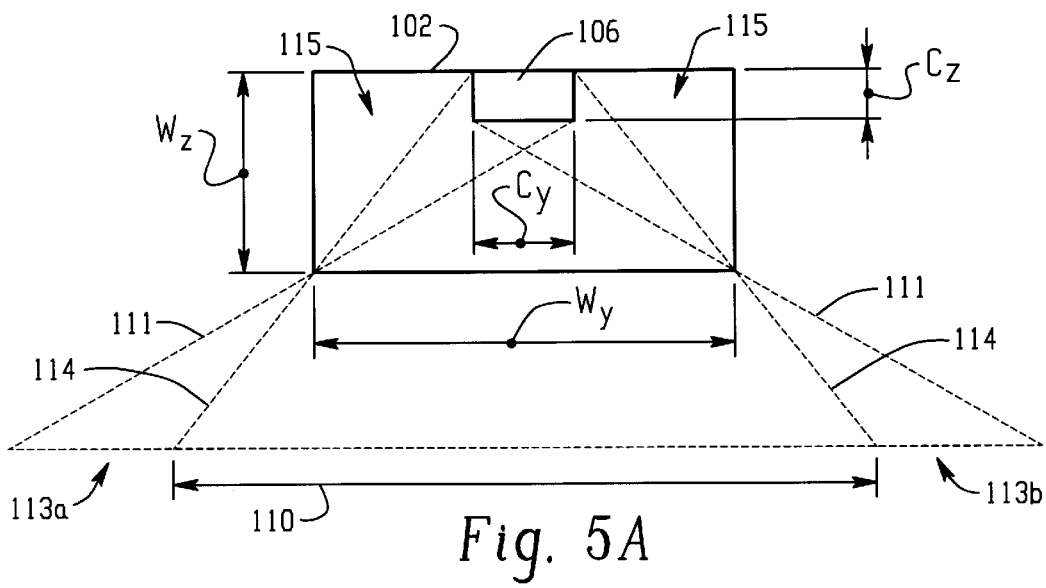
Figure 5B:
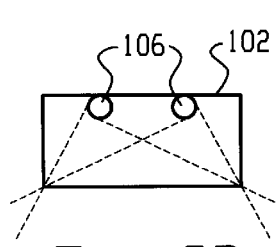

The aperture aspect ratio for detector elements 106 having $C_y > 0$ as depicted in FIG. 5A may be generalized according to the following relationship:

$$\text{Aperature Aspect Ratio} = \frac{LFOV}{W_y} = 1 + \frac{H}{W_z} - \frac{C_y H}{W_y W_z} \qquad \text{Eq. 2}$$

Moreover, the detector ratio may be defined as:

$$\text{Detector ratio} = \frac{\text{detector longitudinal dimension}}{W_y} \quad \text{Eq. 2A}$$

At low energy (e.g., less than about 250 keV), the sensitivity of the detector is approximately linearly related to the perimeter $C_y+2C_z$ of the detector elements 106. Hence, sensitivity may be improved by increasing the perimeter of the detector elements. With reference to Equation 2 and FIG. 5A, however, increasing the perimeter affects the aspect ratio as well as counts received from outside the useful field of view and the cost of the detector elements 106. As illustrated, the detector aspect ratio (LFOV/Cy) is greater than 1 as well as greater than the aperture aspect ratio. Some or all of the slat 102 material in the regions 115 outside the corner projections 114 may also be eliminated. Hence, the septa may have a trapezoidal or other non-rectangular shape.

With reference to FIG. 5A, the aspect ratio described in Equation 2 provides substantially uniform sensitivity across the LFOV 110. An extended field of view is defined by the intersection of the corner projections 111 and the image plane, albeit with reduced sensitivity in the extended field of view portions 113a, 113b. Calculation of the aperture aspect ratio may be adjusted accordingly.

Figure 5C:
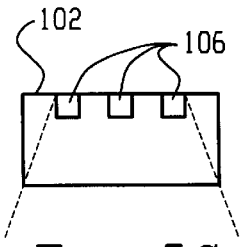
Figure 5D:
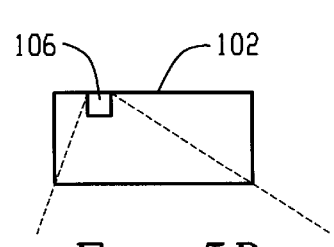

The number of detector elements 106, as well as their size, shape and location, may be varied to provide a desired sensitivity and sensitivity profile. In an exemplary alternate embodiment shown in FIG. 5B, two detector elements having a circular cross section are used. In the embodiment of FIG. 5C, three rectangular detector elements are provided. In the embodiment of FIG. 5D, the detector element is offset from the transverse center of the septa. The desired aspect ratios may be determined based on the detector element 106 and slat 102 geometries as described above.

Electrical connections to the detector elements 106 may be made by placing a conductor such as aluminized mylar between the detector elements 106 and the septa 102. One drawback to this approach, however, is that the thickness of the conductive material introduces a dead space between the septa and the detector elements, which deleteriously affects sensitivity. Grooves or depressions in the septa 102 or in the detector elements 106 may be used to account for some or all of the thickness of the conductor.

Turning now to FIG. 6, an alternate configuration which facilitates electrical connections to the detector elements 106 is shown. The detector elements 106 are located between the septa 102 with their rear surfaces extending beyond the rear surface of the septa 102 so as to permit access to the side surfaces of the detector elements 106. Lead wires 116 are connected to the detector elements 106 using conventional bonding techniques. The lead wires 116 are in turn connected to circuit boards 114 which carry signal conditioning electronics.

With reference to FIG. 7, each of the collimator elements 102 may include a notched region 118. The detector elements 106 are interleaved with corresponding collimator segments 120 to form a detector subassembly 122. The detector elements 106 are adhered to the corresponding collimator segments 120 using an adhesive. Alternately, a mechanical frame arrangement may be used. The collimator assembly 100 and the detector subassembly 120 are assembled separately and subsequently joined.

With reference to FIG. 8A, the notched region in the collimator elements 102 may be eliminated with the detector elements 106 and collimator segments or separators 120 mounted therebehind. The transverse dimension of the collimator segments 120 is preferably greater than or equal to the transverse dimension of the detector elements 106. More particularly, the collimator segments 120 are preferably sized so that their corner projections are at least coextensive with those of the slats. A particular advantage to such an arrangement is that the detector element 106 collimator segment arrangement may be fixedly or movably mounted to the collimator elements 102 in any number of positions.

FIG. 8B depicts the arrangement of FIG. 8A in exploded view. There are thirteen (13) dimensions which need to be specified, plus the number of detector elements 106 (N). The dimensions include the detector element 106 dimensions (Cx, Cy, Cz), the slat 102 dimensions (Wx, Wy, Wz), the separator 120 dimensions (Sx, Sy, Sz), the gap (G) between adjacent slats, the pitch (P=G+Wx) of the slats, and the displacement (Dy) of the detector elements within the separator.

As discussed above, the LFOV of the detector is defined by N×P. The dimensions of the detector elements 106 are influenced a number of factors. The energy resolution, sensitivity, cost, and secondary particle leakage are all influenced by dimension Cx, Cy, and Cz of the detector elements. In an exemplary embodiment which facilitates interchangeability of semiconductor (e.g., CdZnTe) and scintillating (e.g., CsI) detector elements, it may be desirable to select a value of Cx which is suitable for both types of detector elements.

The ratio G/Wz is selected to provide a desired spatial resolution. Slat thickness Wx is selected to maximize sensitivity while minimizing punch through and providing suitable mechanical stability.

Turning now to FIG. 8C, the width Wy of the slats 102 may be determined as follows:

$$W_y = \frac{LFOV \times (C_z + W_z) + H \times C_y}{C_z + W_z + H} \quad \text{Eq. 3}$$

Note that objects extending beyond the FOV 110 will also produce a signal, although of decreasing sensitivity as the lead side shields block the radiation. Total FOV size is given by the equation:

$$FOV = W_y + \frac{H}{W_Z} \times (W_y + C_y) \quad \text{Eq. 4}$$

Provided that the detector pitch corresponds to the pitch of the collimator assembly 100, the thickness $t_s$ of the separators or collimator segments 120 may be less than that of the septa 102. Aluminized mylar or other suitable conductive material may be then placed between the detector elements 106 and the collimator segments 120 to provide the necessary electrical interconnections. Alternately, the rear surfaces of the detector elements 106 may extend beyond the rear surfaces of the collimator segments 120 to facilitate electrical connections as described above.

The height Sz of the separators is preferably greater than or equal to the height Cz of the detector elements. In order to provide proper collimation, the length Sy of the separators 120 is greater than or equal to the length Cy of the detector elements.

In an exemplary embodiment, the various parameters may be selected to be as follows (dimensions in mm):

| Parameter | CdZnTe Detector | CsI Detector |
| --- | --- | --- |
| N | 128 | 128 |
| Cx | 1.5 | 1.5 |
| Cy | 12 | 30 |
| Cz | 8 | 2 |
| Wx | 0.3 | 0.3 |
| Wy | 130 | 130 |
| Wz | 46 | 46 |
| Sx | <0.3 | <0.3 |
| Sy | 37 | 37 |
| Sz | 8 | 2 |
| P | 1.8 | 1.8 |
| G | 1.5 | 1.5 |
| Dy | 8.3 | 2.0 |
| H | 50 | 50 |

Rotating the detector 23 about the axis of rotation 109 provides a circular field of view. The relative angular relationship between the slits and the object being examined may also be varied in coordination with translation of the detector. With reference to FIG. 9A, the detector may be moved along a curve of constant width 200 in coordination with rotation so as to maximize coverage of a field of view 202.

In the illustrated embodiment, the field of view 202 is a square. The term curve of constant width describes a family of figures that, at any orientation within the square, will touch all four sides of the square. As the curve of constant width 200 orbits within the square 202, its centroid likewise traces an orbit 204. In the illustrated embodiment, the curve of constant width 200 is a Reuleaux triangle. A Reuleaux triangle includes three circular arc segments, the endpoints of which intersect the vertices of an equilateral triangle. The rotating detector portion 23 may be visualized as forming one of the sides of the equilateral triangle, i.e. with its longitudinal axis intersecting two vertices of the Reuleaux triangle. It will also be appreciated that a circle is a curve of constant width, albeit one whose centroid does not translate as the circle is rotated within the square.

As the detector 23 is rotated, its center 205 traces a path 206 having a curved diamond shape (similar to an astroid or a hypocycloid of four cusps). Translation and rotation are coordinated so that a line segment 208 perpendicular to the longitudinal axis of the detector 23 and intersecting its longitudinal midpoint traces the path traveled by the centroid 204 of the Reuleaux triangle. The endpoints of the longitudinal axis of the detector 23 trace a substantially square path 210 and produce a concomitant substantially square field of view. The x-y position 206 traced by the detector 23 longitudinal midpoint as a percentage of detector 23 LFOV is depicted at FIG. 9B. The x position of the detector 23 as a function of its angular position θ is depicted in FIG. 9C.

The detector segments may be centered about the transverse extent of the septa. In a preferred embodiment, however, the detectors are offset from the center toward a side of the detector nearer the outside of the square by an amount equal to one fourth the transverse extent of the septa. Alternately, the longitudinal axis may be offset from the transverse center of the detector 23.

A particular advantage of this technique is that substantially uniform sensitivity over the square field of view is provided as compared to rotational orbit of the same detector without translation, as depicted in FIGS. 10A and 10B, respectively. Thus, a smaller detector may be used to provide a desired square field of view. Alternately, the same sized detector may be used to provide a larger field of view than with rotation alone, albeit with less uniform sensitivity. Another advantage of the technique is that the center of the detector does not always point to the same location in the reconstruction field. Because there is no fixed point in the motion of the detector, there is no special point in the reconstruction field. Inasmuch as the orbit is not circularly symmetric, non-uniformities in the detector do not produce ring artifacts. Further, a more uniform field of view is obtained since the detector is, on average, closer to the entire plane of reconstruction. Although the orbit has been described in connection with a Reuleaux triangle, it may be implemented in connection with other curves of constant width, for example curves having five or more sides.

A suitable drive arrangement is used to drive the detector 23 through its orbit. For example, an x-y positioning drive for causing the requisite translational motion together with a rotating drive for causing the requisite coordinated rotation may be used. Inasmuch as the endpoints of the detector 23 longitudinal axis follow the path 210, a geared drive mechanism which engages both ends of the detector 23 and causes them to travel along the path may be implemented to provide coordinated translational and rotational motion.

The disclosed orbit technique may also be used in transmission radionuclide imaging, for example for attenuation correction. A line or generally rectangular sheet source may be moved in the orbit described above, with the object being imaged located between the transmission source and a suitable detector, for example a detector following a coordinated Reuleaux orbit or a conventional gamma camera detector.

It will also be appreciated that the technique is not limited to medical imaging. It may be used where it is necessary to collect other types of position dependent information. Thus, the technique may be used, together with suitable detectors or receivers to detect other types of radiation such as infrared, visible, infrared or other light, thermal radiation, electrical and magnetic fields, and the like. Similarly, the technique may be used, together with suitable emitters or transmitters, in connection with sources of other types of radiation, including those set forth above.

The invention has been described with reference to the preferred embodiments. Obviously, modifications and alterations will occur to others upon reading and understanding the preceding description. It is intended that the invention be construed as including all such modifications an alterations insofar as they come within the scope of the appended claims or the equivalents thereof.

What is claimed is:

1. An apparatus for detecting radiation indicative of an object, the apparatus comprising
    a detector which includes
        a plurality of longitudinally-spaced radiation attenuative septa which define a plurality of slits, each slit having a longitudinal and a transverse dimension, the transverse dimension being greater than the longitudinal dimension; and
        a plurality of radiation sensitive detector segments, each detector segment having a transverse dimension and detecting radiation received in a corresponding slit, the detector having a longitudinal field of view; and
    a drive operatively connected to one of the detector and the object so as to vary the angular relationship between the detector and the object;
    wherein the transverse dimensions of the detector segments are less than the number of detector segments multiplied by their longitudinal pitch.

2. The apparatus of claim 1 wherein a detector segment includes two or more sub-segments, the sum of the transverse dimensions of the sub-segments being less than the longitudinal field of view.

3. The apparatus of claim 1 wherein the detector includes first and second radiation attenuative side shields.

4. The apparatus of claim 1 wherein the detector ratio of the detector is greater than one.

5. The apparatus of claim 1 wherein the transverse dimension of each detector segment is less than the transverse dimension of the corresponding slit.

6. The apparatus of claim 5 wherein each detector segment includes at least two physically discrete detector elements, the sum of the transverse dimensions of the elements being less than the transverse dimension of the corresponding slit.

7. The apparatus of claim 1 further including radiation attenuative members disposed between adjacent detector segments.

8. The apparatus of claim 7 wherein the thickness of the members is less than the thickness of the septa.

9. The apparatus of claim 7 wherein the septa include a material free portion adapted to receive the members.

10. The apparatus of claim 7 including an electrical conductor in electrical contact with a detector segment and disposed between the member and the detector segment.

11. The apparatus of claim 1 wherein the detector segments are physically discrete.

12. The apparatus of claim 1 wherein a cross section of the detector segments is rectangular.

13. The apparatus of claim 1 including a reconstruction processor operatively connected to the detector segments for generating an image indicative of the object.

14. The apparatus of claim 1 comprising means for supporting the detector in relation to the object.

15. The apparatus of claim 1 wherein the detector segments comprise a semiconductor material.

16. The apparatus of claim 15 wherein the semiconductor material is cadmium zinc telluride.

17. The apparatus of claim 1 wherein the detector segments include a scintillating material and a photodetector in optical-communication with the scintillating material.

18. The apparatus of claim 17 wherein the scintillating material is cesium iodide.

19. The apparatus of claim 1 wherein the apparatus includes a second detector.

20. The apparatus of claim 1 wherein the septa include a first portion nearer to the object and a second portion further therefrom and wherein the transverse dimension of the first portion is greater than the transverse dimension of the second portion.

21. The apparatus of claim 20 wherein the transverse dimensions of the detector segments are less than the transverse dimensions of the first portion.

22. The apparatus of claim 1 wherein the septa are parallel and the transverse dimensions of the detector segments are less than the longitudinal field of view.

23. The apparatus of claim 1 wherein the detector is located at a distance from the object such that the transverse dimensions of the detector segments are less than the longitudinal field of view.

24. An apparatus for generating an image of an object under examination, the apparatus comprising:
  a detector which includes
    a collimator having a plurality of longitudinally spaced radiation attenuative elements which define a plurality of longitudinally spaced apertures each having a transverse dimension greater than its longitudinal dimension, the collimator being movable during the examination so as to vary the angular relationship between the apertures and the object;
    a plurality of detector segments sensitive to radiation indicative of radionuclide decays, each detector segment having a transverse dimension and detecting radiation received in a corresponding aperture, the detector ratio of the detector being greater than one;
  a reconstruction processor operatively connected to the detector segments for generating an image indicative of the object.

25. The apparatus of claim 24 wherein the transverse dimension of each detector segment is less than the transverse dimension of its respective aperture.

26. The apparatus of claim 24 wherein the detector segments include a semiconductor.

27. The apparatus of claim 26 wherein the semiconductor is cadmium zinc telluride.

28. The apparatus of claim 24 wherein the detector segments include a scintillating material and a photodetector in optical communication with the scintillating material.

29. The apparatus of claim 28 wherein the scintillating material is cesium iodide.

30. The apparatus of claim 24 further including means for varying the relative positions of the detector and the object.

31. The apparatus of claim 24 wherein the transverse dimensions of the apertures are greater than the transverse dimensions of their corresponding detector segments.

32. The apparatus of claim 24 including a first detector segment which detects radiation received in a first aperture, a second detector segment which detects radiation received in a second aperture adjacent to the first, and a radiation attenuative member disposed between the first and second detector segments.

33. The apparatus of claim 32 wherein a radiation attenuative element disposed between the first and second apertures includes a material free region adapted to received the radiation attenuative member.

34. The apparatus of claim 32 wherein the thickness of a radiation attenuative element disposed between the first and second apertures is greater than the thickness of the radiation attenuative member.

35. The apparatus of claim 24 wherein the radiation attenuative elements are parallel and the aperture aspect ratio is greater than one.

36. The apparatus of claim 24 wherein the detector is located at a distance from the object such that the transverse dimensions of the detector segments are less than the longitudinal field of view.

37. A rotating laminar radionuclide camera having a detector ratio greater than one.

38. The apparatus of claim 37 wherein the septa are parallel and the aperture aspect ratio is greater than one.

39. The camera of claim 38 wherein the detector aspect ratio is greater than the aperture aspect ratio.

40. An apparatus for detecting radiation indicative of radionuclide decays comprising:
  a collimator having a plurality of parallel, longitudinally-spaced, radiation attenuative elements extending in a transverse direction, the elements defining a plurality of longitudinally-spaced apertures for receiving radiation indicative of radionuclide decays, the transverse dimension of each aperture being greater than its longitudinal dimension;
  a plurality of detector segments, each detector segment having a transverse dimension and generating a signal indicative of radiation received in a corresponding aperture, the transverse dimension of each detector segment being less than the transverse dimension of its corresponding aperture; and a drive operatively connected to the collimator and the detector segments, the collimator and the detector segments being rotatable about an axis of rotation so as to vary the angular relationship between the apertures and an object under examination.

41. The apparatus of claim 40 wherein the radiation attenuative elements are parallel the aperture aspect ratio of the detector is greater than one.

42. The apparatus of claim 40 wherein a first detector segment detects radiation received in a first aperture and a second detector segment detects radiation received in a second aperture adjacent to the first, and further including a radiation attenuative member interposed between the first and second detector segments.

43. The apparatus of claim 42 wherein a radiation attenuative element includes a material free region adapted to receive the radiation attenuative member.

44. The apparatus of claim 42 wherein the thickness of a radiation attenuative element disposed between the first and second apertures is greater than the thickness of the radiation attenuative member.

45. The apparatus of claim 40 wherein the radiation attenuative element has a transverse dimension greater than the transverse dimensions of the first and second detector segments.

46. An apparatus for detecting radiation indicative of an object, the apparatus comprising a detector which includes a plurality of longitudinally-spaced radiation attenuative septa which define a plurality of parallel slits, each slit having a longitudinal and a transverse dimension, the transverse dimension being greater than the longitudinal dimension; and a plurality of radiation sensitive detector segments, each detector segment having a transverse dimension and detecting radiation received in a corresponding slit;

wherein the detector further includes a plurality of radiation attenuative members disposed between adjacent detector segments, and wherein the detector segments and the radiation attenuative members are mounted for transverse movement relative to the septa.

* * * * *